Jan. 21, 1969

J. R. LOUIS 3,423,602

LOGIC CIRCUIT

Original Filed Oct. 10, 1962

INVENTOR.
JOHN R. LOUIS
BY
ATTORNEY

INVENTOR.
JOHN R. LOUIS
BY
ATTORNEY

United States Patent Office 3,423,602
Patented Jan. 21, 1969

3,423,602
LOGIC CIRCUIT
John R. Louis, 5 Chestnut Square,
Foxboro, Mass. 02035
Original application Oct. 10, 1962, Ser. No. 229,544.
Divided and this application Oct. 11, 1965, Ser.
No. 494,636
U.S. Cl. 307—235        6 Claims
Int. Cl. H03k 5/20

ABSTRACT OF THE DISCLOSURE

A logic circuit employing setpoint and compare circuits to establish a positive, direct voltage output when one setpoint condition is exceeded by an input signal, a negative direct voltage output when a second setpoint condition is exceeded and a zero output in a deadband zone between the two setpoint conditions.

This application is a division of application 229,544, filed Oct. 10, 1962, now Patent 3,243,664.

This invention relates to control apparatus and more particularly to an improved on-off type of controller.

In an on-off type of controller or alarm device hysteresis effects of components such as electric relays affect the control or alarm accuracy. To achieve maximum accuracy of the on-off controller it is necessary for the output to appear and disappear at the same value of the input. However, in the case of a device such as a relay having hysteresis characteristics, the pickup current is larger than the drop-out current and an error corresponding to the differential is introduced, and the desired on-off operation is not achieved.

It is a principal object of this invention to provide an improved on-off type of controller the accuracy of which is substantially unaffected by component hysteresis.

Another object of the invention is to provide an on-off type of controller having three output conditions.

Another object of the invention is to provide an improved circuit for discriminating between signals of opposite phase.

In one embodiment of the invention an input logic circuit is effective to establish a positive direct voltage output when one setpoint condition is exceeded by an input signal, a negative direct voltage output signal when a second setpoint condition is exceeded and a zero output in a dead-band zone between the two setpoint conditions. The output of the logic circuit is converted to an alternating signal which has one phase when the output of the logic circuit is positive and the opposite phase when the output of the logic circuit is negative. A phase discriminating output circuit is effective to establish one output condition when the output of the input logic circuit is zero, a second output condition when the alternating signal is of one phase and a third output condition when the alternating signal is of the opposite phase.

Other objects and advantages will become apparent from the following description taken in connection with the accompanying drawings wherein.

GENERAL DESCRIPTION

Figure 1:
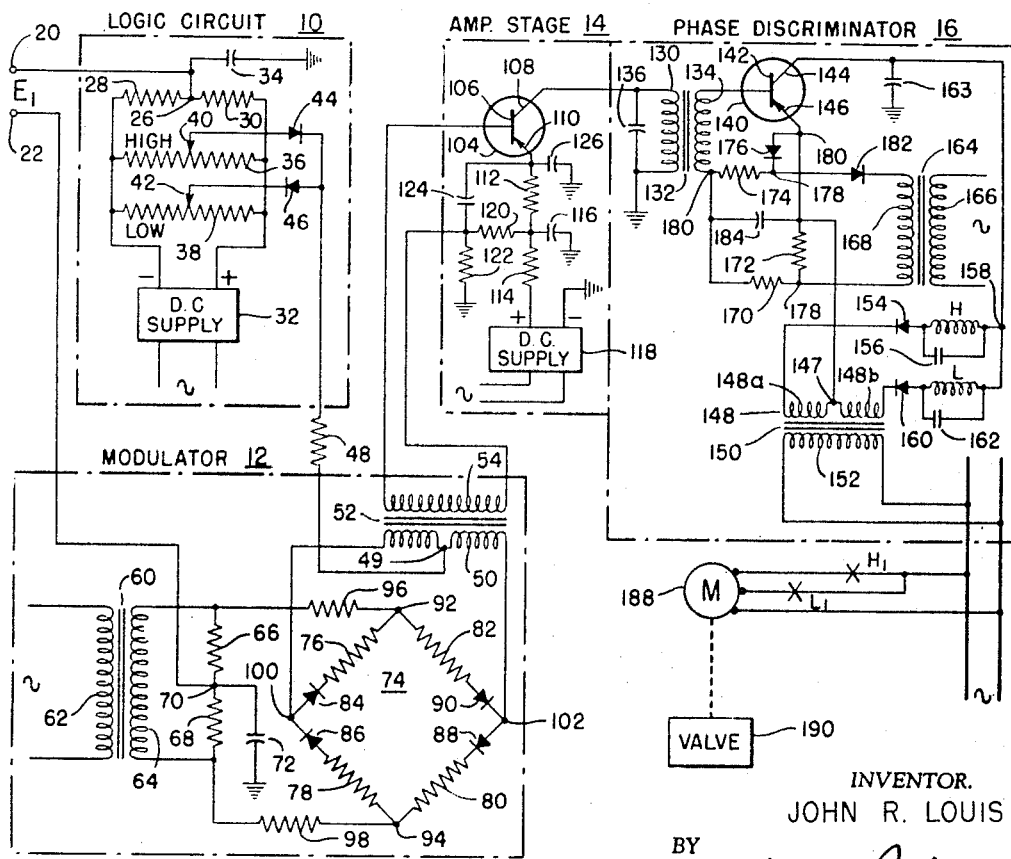
FIG. 1 is a schematic illustration of an on-off controller embodying the invention.

Referring to FIG. 1 there is shown a setpoint logic circuit 10 responsive to a D-C input error signal $E_1$ for establishing a D-C output signal of one polarity when the signal $E_1$ exceeds a first setpoint signal and a D-C output signal of the opposite polarity when the signal $E_1$ exceeds a second setpoint signal. When the signal $E_1$ has a magnitude intermediate in magnitude the output of logic circuit 10 will be zero.

A modulator circuit 12 is effective to convert the D-C output of logic circuit 10 to an alternating signal having a phase dependent upon the output polarity. An A-C amplifier stage 14 is provided to amplify the A-C signal established by the modulator 12. A phase discriminator stage 16 is responsive to the output of stage 14 and operative to selectively establish one of several output conditions in accordance with the phase and existance of the A-C signal.

SETPOINT LOGIC CIRCUIT 10

The setpoint logic circuit 10 includes a pair of input terminals 20 and 22 to which the input signal $E_1$ is applied. The terminal 22 is connected to the modulator circuit 12 while terminal 20 is connected to the common junction 26 of two resistors 28 and 30 connected in series across a D-C power supply 32. A capacitor 34 is connected between junction 26 and ground and serves to remove any A-C components in the input signal $E_1$. A pair of slidewire resistors 36 and 38 having adjustable contacts 40 and 42 respectively are connected across the power source 32 to each form a resistance bridge circuit with resistors 28 and 30. To complete the setpoint logic circuit 10 a pair of diode rectifier elements 44 and 46 are connected with the polarity arrangement shown between contacts 40 and 42 respectively and one end of a resistor 48. The other end of resistor 48 is connected to the center tap terminal 49 of a primary winding 50 of a transformer 52 having a secondary winding 54. The transformer 52 forms part of the modulator circuit 12 and provides a transformer coupling between setpoint logic circuit 10 and amplifier stage 14.

The circuit polarity arrangement of diode rectifier elements 44 and 46 is such that element 44 will be reverse biased by a negative setpoint potential at contact 40 and element 46 will be reverse biased by a positive setpoint potential at contact 42, the magnitudes of the setpoint potentials being determined by the position of the contacts 40 and 42. In the absence of an input error signal $E_1$ the potential will be zero at junction 26 and at the midpoint at each of resistors 36 and 38. At this zero input condition contact 40 is adjusted to a desired negative setpoint potential to reverse bias diode element 44 and contact 42 is adjusted to a desired positive setpoint potential to reverse bias diode element 46.

When a positive input signal $E_1$ applied to terminals 20 and 22 exceeds in magnitude the initial negative setpoint potential of contact 40 the diode element 44 will be biased conductive to effectively connect terminal 20 to primary winding 50 through resistor 48 to produce a positive output voltage at terminal 49 equal to the magnitude of the input signal $E_1$. Similarly when a negative input signal $E_1$ exceeds in magnitude the positive setpoint potential of contact 42 the diode element 46 will be forward biased and conduct to connect terminal 20 to resistance element 48 and establish a negative output voltage at terminal 49 equal to the negative input signal $E_1$.

Diode element 44 thus conducts in response to a positive error signal $E_1$ of predetermined magnitude dependent upon the setting of contact 40 to establish a positive output voltage at terminal 49 while diode element 46 conducts in response to a negative error signal $E_1$ of predetermined magnitude dependent upon the setting of contact 42 to establish a negative output voltage at terminal 49. When the input signal $E_1$ is intermediate the two setpoint potentials in magnitude neither diode will conduct and the output voltage will be zero. The logic circuit 10 accordingly has a deadband of zero output between two adjustable setpoints, an output of one polarity being produced beyond one end of the dead-band range and an output of the opposite polarity being produced beyond the other end of the dead-band range. The circuit thus has three output conditions which may be adjusted as desired by adjustment of contacts 40 and 42.

MODULATOR 12

The modulator 12 includes a transformer 60 having a primary winding 62 coupled to an A-C source and a secondary winding 64. A pair of resistors 66 and 68 are connected across the secondary winding 64, and have a common junction 70 connected by a capacitor 72 to ground and connected to input terminal 22. Capacitor 72 is cooperative with capacitor 34 to remove A-C components from the signal $E_1$. A modulator bridge circuit 74, comprising resistors 76, 78, 80 and 82 and diode rectifiers 84, 86, 88 and 90, has input terminals 92 and 94 connected by resistors 96 and 98 respectively to secondary winding 64 to effect energization of the bridge by the A-C source voltage. To complete the modulator circuit terminals 100 and 102 of bridge circuit 74 are connected to the ends of primary winding 50 respectively.

In operation of the modulator 12 when terminal 92 is positive and terminal 94 is negative during one-half cycle of the A-C source diode elements 90 and 88 will be forward biased to connect terminal 102 to terminal 70 through a resistance circuit to impress the output of logic circuit 10 across the right half of winding 50. During the next half cycle terminal 94 will be positive and terminal 92 negative to bias diode elements 84 and 86 conductive and diode elements 88 and 90 nonconductive. Accordingly, a circuit will be established from terminal 100 to terminal 70 through a resistance circuit to impress the output of logic circuit 10 across the left half of winding 50.

The modulator 12 is effective in the above described manner to alternately apply the output of circuit 10 to the separate halves of primary winding 50 to thereby establish an alternating signal across the secondary winding 54 corresponding in phase to the polarity of the direct voltage output of logic circuit 10. Preferably the turns ratio between one-half of primary winding 50 and secondary winding 54 is high to magnify the input impedance of amplifier stage 14 as reflected across the transformer 52 to present a high input impedance to the input signal $E_1$ applied to terminals 20 and 22.

A-C AMPLIFIER STAGE 14

The amplifying stage 14 is effective to amplify an A-C signal across secondary winding 54 established in the above described manner and comprises a common emitter stage formed by a transistor 104 having a base electrode 106, a collector electrode 108 and an emitter electrode 110. The base electrode 106 is connected to one end of secondary winding 54 while the emitter electrode 110 is connected through emitter resistance 112 and a filter circuit comprising a resistance 114 and capacitor 116 to the positive terminal of a D-C power supply 118. The junction of resistors 112 and 114 is connected by a bias resistor 120 to the right end of secondary winding 54, and a bias resistor 122 is connected between said end and ground. A bypass capacitor 124 for bias resistors 120 and 122 is connected between the emitter electrode 110 and the right end of secondary winding 54 while a second bypass capacitor 126 is connected between the emitter electrode 110 and ground. The collector electrode 108 is connected to one end of a primary winding 130 of a coupling transformer 132 having a secondary winding 134. The primary winding 130 is shunted by capacitor 136 and has the lower end thereof connected to ground.

The stage 14 functions to amplify an alternating signal induced into secondary winding 54 in a manner well known to those skilled in the art to produce an amplified output signal across the primary winding 130 of transformer 132. The transformer 132 functions to establish an inductive coupling between amplifying stage 14 and the phase discriminator output stage 16.

PHASE DISCRIMINATOR 16

The output phase discriminating stage 16 uniquely establishes three output conditions corresponding respectively to the three possible output conditions of setpoint logic circuit 10. The circuit 16 comprises a transistor 140 having a base electrode 142, a collector electrode 144 and an emitter electrode 146. The base electrode 142 is connected to the upper end of secondary winding 134 while the emitter electrode 146 is connected to the center tap 147 of a secondary winding 148 of a transformer 150 having a primary winding 152 connected to an A-C source. Center tap 147 electrically divides primary winding 148 into winding halves 148a and 148b. The end of secondary winding half 148a is connected through a diode rectifier element 154 and a relay coil H, shunted by a capacitor 156, to a terminal 158 which is connected to the collector electrode 144. The end of winding half 148b is connected in a parallel circuit through a diode rectifier element 160 and a relay coil L shunted by a capacitor 162, to the terminal 158. A capacitor 163 is connected between collector electrode 144 and ground.

The circuitry described defines two parallel circuits for flow of collector current between the emitter electrode 146 and collector electrode 144, one circuit comprising winding half 148b, diode element 160 and relay coil L, and the other circuit comprising winding half 148a, diode rectifier element 154 and relay coil H. As will be presently described in more detail the parallel circuit through which the collector current will flow and the energization of relay coils L and H is dependent upon the phase relationship of the A-C source voltage and the input signal to phase discriminator 16.

The transistor 140 is normally biased by a power supply circuit to establish a negative bias voltage $E_b$ for the base electrode 142 and to establish a quiescent value of D-C collector current in the absence of a signal input. To this end a transformer 164 is provided with a primary winding 166 coupled to the A-C source and a secondary winding 168 coupled to a bridge circuit formed by resistors 170, 172 and 174 and a diode recetifier element 176, and having input terminals 178 and output terminals 180.

A diode rectifier element 182 connected between one end of secondary winding 168 and one input terminal 178 of the bridge serves to effect half-wave rectification of the A-C source voltage. The diode rectifier 176 in the power supply bridge circuit serves to compensate for variations in the base to emitter voltage drop of transistor 140 with temperature. The output terminals 180 of the bridge are coupled to the lower end of secondary winding 134 and the emitter electrode 146. A filter capacitor 184 is connected across the bridge output terminals 180.

Figure 2:
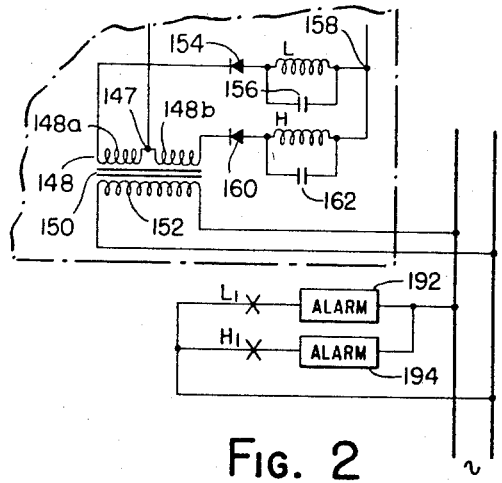
FIG. 2 is a schematic illustration of an alternate circuit for a portion of the system illustrated in FIG. 1.

The relays L and H are in FIG. 1 shown as provided with contacts $L_1$ and $H_1$ respectively which are arranged to control energization and the direction of rotation of an electric motor 188 which may be arranged to position a valve 190 to perform a controlling function. In FIG. 2 there is shown the arrangement of the system to perform an alarm function. In FIG. 2 relay contacts $L_1$ and $H_1$ control energization of alarm devices 192 and 194 respectively which provide an indication or warning signal when the high or low setpoint conditions have been exceeded.

In operation of the output phase discriminating stage 16 reference is made to FIG. 3 which illustrates the various signal conditions during operation of the circuit.

Assume initially that the input signal $E_1$ is intermediate the two setpoint voltage signals and that the output of logic circuit 10 is thus zero.

Figure 3A:
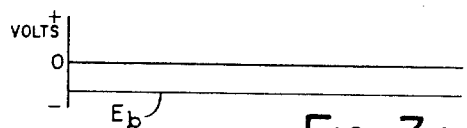
FIG. 3 is a series of graphs illustrating the operation of the system in FIG. 1.
Figure 3B:
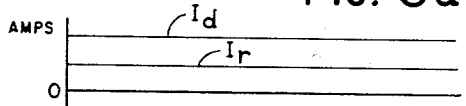
Figure 3C:
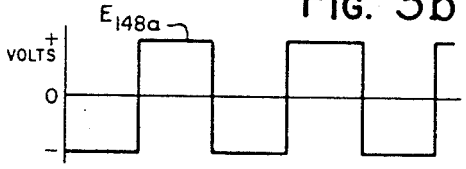
Figure 3D:
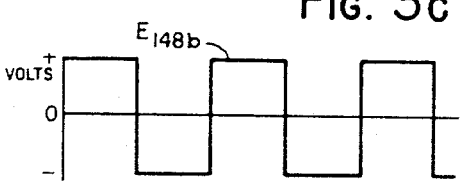
Figure 3E:
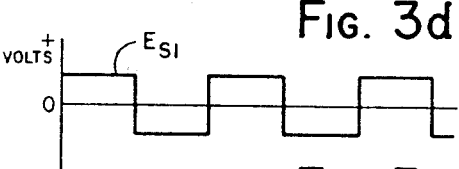

At the zero output condition of logic circuit 10 transistor 140 will be biased conductive by the A-C source voltage induced in separate halves of winding 148 and by the negative bias voltage $E_b$ (FIG. 3a) to establish a quiescent value of D-C current $I_r$ which, as shown in FIG. 3b, is below the drop-out current $I_d$ of relay coils L and H. Voltages E148a and E148b having the wave form and opposite phase relationship as illustrated in FIGS. 3c and 3d are induced in winding halves 148a and 148b respectively. During the first half cycle the negative voltage across winding half 148a will forward bias diode rectifier 154 to establish a circuit for collector current $I_r$ through relay coil H and to establish the proper collector emitter polarity of transistor 140. During conduction of diode 154 the positive induced voltage across winding half 148b will reverse bias diode element 160 to render the same nonconductive.

During the next half cycle the negative induced voltage across winding half 148b will render diode element 160 conductive to establish a circuit for collector current through relay coil L and to establish the proper collector-emitter polarity of transistor 140 during the second half cycle. During conduction of diode element 160, diode element 154 is reverse biased and nonconductive. Thus, the diode elements 154 and 160 and winding 148 function to establish the proper collector-emitter polarity and a collector current $I_r$ at all times but through alternate relay circuits at a rate determined by the line frequency.

Figure 3F:
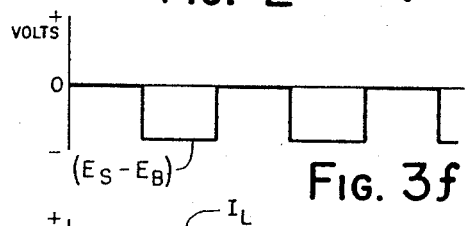

Assume now a signal $E_{s1}$ (FIG. 3e) appears across secondary winding 134 of transformer 132. This signal input will have a phase dependent upon whether the high or low setpoint has been exceeded and may, for example, be of the phase illustrated in FIG. 3e when the high setpoint condition is exceeded. The signal $E_{s1}$ will combine with the bias voltage signal $E_b$ as illustrated in FIG. 3f to produce a resultant voltage input to base electrode 142. During the first half cycle, the signal $E_{s1}$ will be positive causing a reduction in collector current when added to the bias voltage $E_b$. If the base to emitter voltage need only be zero to turn the transistor off, the signal $E_{s1}$ will produce zero collector current flow during the first half cycle.

Figure 3G:
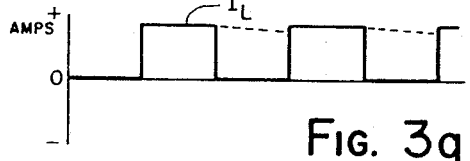

During the second half the signal $E_{s1}$ is negative and hence adds to the negative bias voltage $E_b$ to increase the base to emitter voltage of transistor 140 and produce an increased collector current $I_L$ as shown in FIG. 3g. Since during this half cycle the voltage across winding half 148b is negative diode element 160 will conduct to establish a circuit for collector current through relay coil L. The increased collector current will exceed the pickup current of relay L effecting energization of the same and closure of contacts $L_1$. Capacitor 162 will charge during the half cycle of increased collector current and discharge during the next half cycle when the transistor 140 is turned off as indicated by the dotted portion of the curve in FIG. 3g to sustain energization of relay L. Thus, as long as a signal $E_{s1}$ exists relay coil L will be energized.

Figure 3H:
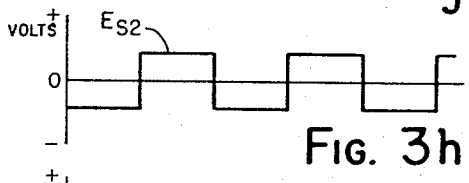
Figure 3I:
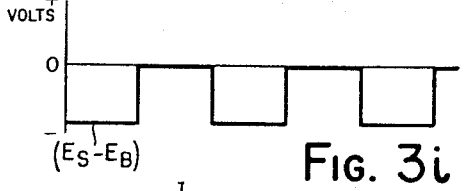
Figure 3J:
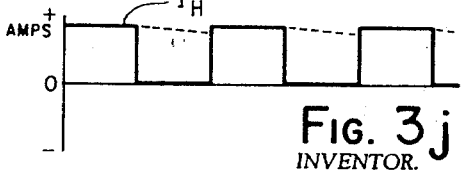

If a signal $E_{s2}$ of the opposite phase, as a result of the other setpoint being exceeded, appears across winding 134 the signal conditions illustrated in FIGS. 3h, 3i and 3j will exist. The signal $E_{s2}$ will be negative during the first half cycle as shown in FIG. 3h and add to the bias voltage $E_b$ as shown in FIG. 3i to increase the negative bias on base electrode 142 and effect an increase in collector current. During this same half cycle the voltage across winding 148a is negative causing diode element 154 to be forward biased to complete a circuit for collector current through relay H. The increased collector current will exceed the pickup current rating of relay H effecting energization of the same. During the second half cycle of signal $E_{s2}$ a reduction in base electrode bias will occur causing a reduction in collector current sufficient to turn transistor 140 off. Energization of relay H will be sustained however through operation of capacitor 156. Thus, a current $I_H$ as shown in FIG. 3j will flow through relay H as long as signal $E_{s2}$ exists.

The phase discriminator 16 accordingly functions in the above manner to effect selective energization of relays H and L according to the existence of and phase of a signal across secondary winding 134.

OPERATION—FIG. 1

To summarize the operation of the system illustrated in FIG. 1 assume that movable contacts 40 and 42 are adjusted to potentials of −10 and +10 volts respectively to set high and low setpoints of +10 and −10 volts respectively. If the input signal $E_1$ is intermediate these two setpoints in magnitude diodes 44 and 46 will be reverse biased and the output of logic circuit 10 will be zero. Accordingly, the output of amplifier stage 14 and the potential across secondary winding 134 will be zero. As a result the base electrode 142 of transistor 140 will be biased by bias voltage $E_b$ as discussed in connection with FIG. 3a, and a collector current $I_r$, smaller in magnitude than the drop-out current of relays L and H, will flow through the relays during alternate half cycles of the source voltage as the diode elements 154 and 160 become alternately forward and reverse biased by the voltages induced in winding halves 148a and 148b. Thus, when the input signal is intermediate the two set point magnitudes neither relay will be energized.

If the input signal $E_1$ exceeds the high setpoint condition determined by the position of contact 40 diode element 44 will be forward biased to produce a positive output signal from logic circuit 10 which is converted to an alternating signal by modulator 12 and amplified in amplifying stage 14. As a result a voltage signal $E_{s1}$ of the phase indicated in FIG. 3e will appear across secondary winding 134. During the first half cycle of the signal $E_{s1}$, the base electrode potential of transistor 140 will become more positive reducing the collector current flow to substantially zero. During the second half cycle, however, the voltage $E_{s1}$ will add to the bias voltage $E_b$ causing a substantial increase in collector current as shown in FIG. 3f to a magnitude which exceeds the pickup current rating of relays L and H. During the second half cycle diode 160 is biased conductive to establish a circuit for collector current through relay L. As a result relay L will be energized and remain energized through the charging and discharging operation of capacitor 162.

If the input signal $E_1$ should exceed the low setpoint condition determined by contact 42, a negative direct voltage output signal from logic circuit 10 will occur which is converted to an alternating voltage signal by modulator 12 and amplified by amplifier stage 14. In this case a signal $E_{s2}$ opposite in phase from the signal $E_{s1}$ will appear across secondary winding 134. Consequently during the first half cycle of signal $E_{s2}$ the base electrode potential of transistor 140 will become more negative causing an increase in collector current to a value exceeding the pickup value of relays L and H. Since during this half cycle the diode 154 is forward biased to establish a circuit for collector current through relay H the latter will be energized.

The system thus functions to establish A-C signals of opposite phase depending upon whether the high or low setpoint condition is exceeded. The phase discriminating stage 16 functions to selectively energize relays L and H depending on the phase of the A-C signal.

The system disclosed in FIG. 1 provides a three-position on-off type of control the accuracy of which is not affected by the hysteresis of relays L and H. The logic circuit 10 establishes an input to phase discriminator stage 16 which is either zero or exceeds the pickup current of the relays in magnitude. Thus, when the input signal $E_1$ exceeds one of these setpoints instantaneous energization of the appropriate relay occurs. Similarly, upon subsequent decrease of the signal $E_1$ instantaneous deenergization of the relay also occurs.

Contacts 40 and 42 may be independently adjusted to set the high and low setpoints respectively and to establish the desired dead-band range of zero output between the two setpoints.

EMBODIMENT—FIG. 4

Figure 4:
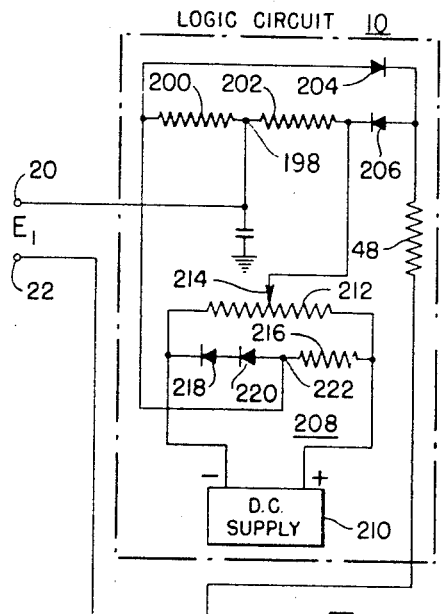
FIG. 4 is a schematic illustration of another embodiment of the logic circuit for the system of FIG. 1.

In FIG. 4 I have illustrated a second embodiment of the logic circuit 10 for producing symmetrical negative and positive setpoints with respect to a zero reference point and having a single dead-band adjustment. More particularly in FIG. 4 the input terminal 20 is connected to the junction 198 of two resistors 200 and 202 the oppositely disposed ends of which are connected by diode rectifiers 204 and 206 to resistor 48.

An adjustable voltage is established across the resistors 200 and 202 by a bridge circuit 208 coupled to a direct voltage power supply 210. The bridge circuit 208 comprises a slidewire resistance 212 having an adjustable contact 214, a fixed resistor 216 and a pair of diode rectifiers 218 and 220 which compensate for variations in temperature affecting the logic diodes 204 and 206. Contact 214 is connected to the junction of diode element 206 and resistor 202 while terminal 222 is connected to the junction of resistor 200 and diode element 204. The bridge circuit 208 and power supply 210 function to establish equal positive and negative voltages across resistors 200 and 202 respectively the magnitude of which is dependent upon the position of contact 214.

If the input signal $E_1$ is zero or intermediate the voltages across resistors 200 and 202, the diodes 204 and 206 will be reverse biased and the output of logic circuit 10 will be zero. If a positive input signal $E_1$ should exceed in magnitude the negative setpoint voltage across resistor 200 the diode element 204 will become forward biased to produce a positive output signal. Similarly if a negative input signal $E_1$ should exceed in magnitude the positive setpoint voltage across resistor 202, diode element 206 will conduct to produce a negative output signal from the circuit. Thus, the circuit functions similar to the embodiment shown in FIG. 1 to produce a positive or negative output signal depending on which setpoint is exceeded.

Adjustment of the movable contact 214 serves to vary equally the positive and negative setpoint voltages across resistors 200 and 202 and thus serves to vary the dead-band between the two setpoints by symmetrically varying the setpoint magnitudes. The logic circuit 10 illustrated in FIG. 4 finds particular utility in a control system where only dead-band adjustment is required.

PROCESS APPLICATION—FIG. 5

Figure 5:
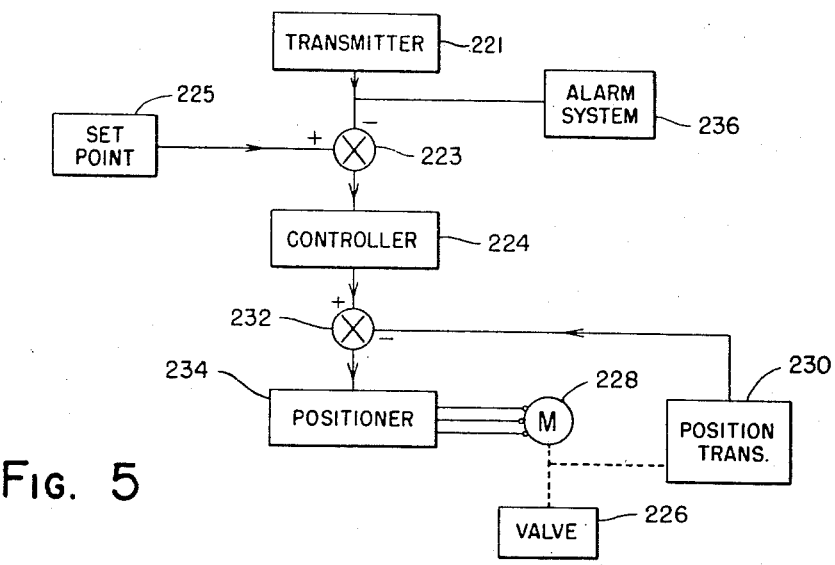
FIG. 5 is a schematic block diagram of a process control system illustrating the application of the invention.

In FIG. 5 I have illustrated the application of the invention to a process control system as both a high-low alarm system and as a positioning controller.

The process control system comprises in general a transmitting device 221 for establishing a signal representative of the magnitude of a variable. The output of transmitter 221 is compared with an adjustable setpoint voltage established by setpoint circuit 225 in a summing circuit 223 to establish an error signal which is amplified and provided with desired characteristics in an electric controller 224.

The system of FIG. 5 utilizes a final control element such as a valve 226 positioned by an electric motor 228. A position transmitter 230 establishes an electric signal representative of the position of valve 226.

The output of controller 224 is compared with the output of position transmitter 230 in a summing circuit 232 to establish a difference signal which is utilized as the input signal for a positioning controller 234 comprising the system shown in FIG. 1. The controller 234 functions to compare the error signal established by circuit 232 with high and low setpoint signals in logic circuit 10 to establish three-position on-off operation thereof to effect positioning of the motor 228 as described in connection with motor 168 of FIG. 1. If symmetrical setpoints are required a logic circuit 10 of the type illustrated in FIG. 4 is preferably utilized.

To provide for high and low alarm indication the output signal of transmitter 221 is utilized as an input to alarm system 236 also comprising the system of FIG. 1 provided with the alarm circuitry shown in FIG. 2. In this case the logic circuit 10 shown in FIG. 1 having separately adjustable high and low setpoints is preferably utilized in preference to the circuit disclosed in FIG. 4 to provide independent high and low alarm setpoint adjustment.

It will be apparent to those skilled in the art that many changes may be made in the construction and arrangement of parts without departing from the scope of the invention as defined in the appended claims.

What I claim as new and desire to secure by Letters Patent of the United States is:

1. A logic circuit for comparing an input signal with a first setpoint potential and a second setpoint potential comprising:

a first comparison circuit having a variable resistance and an adjustable contact associated with said variable resistance for determining the first setpoint potential and for comparing the input signal therewith to establish a first potential difference;

a first diode rectifier element connected between the adjustable contact of said first comparison circuit variable resistor and a logic circuit output terminal, said diode rectifier arranged to be reverse biased when said first potential difference is negative and forward biased when said first potential difference is positive to establish an output from said first comparison circuit;

a second comparison circuit having a variable resistance and an adjustable contact associated with said variable resistance for determining the second setpoint potential and for comparing the input signal therewith to establish a second potential difference; and a second diode rectifier element connected between the adjustable contact of said second comparison circuit variable resistor and the logic circuit output terminal, said diode rectifier arranged to be reverse biased when said second potential difference is positive and forward biased when said second potential difference is negative to establish an output signal from said second comparison circuit.

2. A logic circuit for comparing an input signal with a first setpoint potential and a second setpoint potential as claimed in claim 1 wherein said first and second comparison circuits include:

a D-C voltage source, said voltage source connected across the variable resistance of the first and second comparison circuits;

a pair of resistors connected across said D.C. voltage source and having a common junction, said resistor pair cooperating with the variable resistance of said first and second comparison circuits to form a first and second bridge circuit; and means for applying the input signal to the junction of said resistor pair.

3. A logic circuit for comparing an input signal with a first setpoint potential and a second setpoint potential as claimed in claim 2 wherein the first bridge circuit develops a high voltage setpoint with the variable resistance providing selection of a desired setpoint potential such that a positive input signal exceeds in magnitude the negative setpoint potential causing said first diode rectifier to be forward biased and to conduct a positive signal to the output terminal; and the second bridge circuit develops a low voltage setpoint with the variable resistance providing selection of a desired setpoint potential such that a negative input signal exceeds in magnitude the positive setpoint potential causing said second diode rectifier to be forward biased and to conduct a negative signal to the output terminal.

4. A logic circuit for comparing an input signal and a first setpoint potential and a second setpoint potential comprising:

a D-C voltage source;

a bridge circuit having input and output terminals, said input terminals connected across said D-C voltage source;

a first and second resistor connected serially across the output terminals of said bridge circuit and having a common junction to establish positive and negative setpoint voltages across said resistors respectively;

means for applying an input signal to said junction;

a first diode rectifier element connecting the end of said first resistor to a common output terminal, said diode rectifier arranged to be reverse biased when the voltage difference between the input signal and the voltage across said first resistor is negative and to be forward biased when said voltage difference is positive and to produce a positive output voltage at the output terminal; and a second diode rectifier element connecting the end of said second resistor to said common output terminal, said diode rectifier arranged to be reverse biased when the voltage difference between the input signal and the voltage across said first resistor is positive and to be forward biased when said voltage difference is negative and to produce a negative output voltage at the output terminal.

5. A logic circuit for comparing an input signal in a first setpoint potential and a second setpoint potential as claimed in claim 4 wherein one of said bridge circuit outputs includes a variable resistance having an adjustable contact, said contact functioning to establish equal positive and negative setpoints across said first and second resistors respectively, the magnitude of said equal setpoint voltages being dependent upon the position of said contact.

6. A logic circuit for comparing an input signal and a first setpoint potential and a second setpoint potential as claimed in claim 5 wherein the voltage developed across said first resistor by said bridge circuit represents a high-voltage setpoint and the voltage developed across said second resistor represents a low-voltage setpoint.

References Cited

UNITED STATES PATENTS

| 2,505,072 | 5/1950 | Sunstien | 323—75 |
| 2,584,800 | 2/1952 | Grisdale | 323—75 |

OTHER REFERENCES

"Diode Limiters Simulate Mechanical Phenomena," by Morrill et al., Electronics, November 1952, pp. 122 and 123.

ARTHUR GAUSS, Primary Examiner.

B. P. DAVIS, Assistant Examiner.

U.S. Cl. X.R.

307—257; 323—75; 328—208